US009761070B2

(12) United States Patent
Juzswik

(10) Patent No.: US 9,761,070 B2
(45) Date of Patent: Sep. 12, 2017

(54) METHOD AND APPARATUS FOR HANDS-FREE OPENING OF A DOOR

(71) Applicant: TRW AUTOMOTIVE U.S. LLC, Livonia, MI (US)

(72) Inventor: David L. Juzswik, Commerce Township, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 0 days.

(21) Appl. No.: 14/397,336

(22) PCT Filed: May 21, 2013

(86) PCT No.: PCT/US2013/041924
§ 371 (c)(1),
(2) Date: Oct. 27, 2014

(87) PCT Pub. No.: WO2013/177097
PCT Pub. Date: Nov. 28, 2013

(65) Prior Publication Data
US 2015/0116085 A1 Apr. 30, 2015

Related U.S. Application Data

(60) Provisional application No. 61/650,285, filed on May 22, 2012.

(51) Int. Cl.
*G07C 9/00* (2006.01)
*G08B 21/22* (2006.01)
(Continued)

(52) U.S. Cl.
CPC .......... *G07C 9/00111* (2013.01); *B60R 25/24* (2013.01); *G08B 3/10* (2013.01); *G08B 21/22* (2013.01)

(58) Field of Classification Search
None
See application file for complete search history.

(56) References Cited

U.S. PATENT DOCUMENTS 4,783,658 A 11/1988 Nakano et al.
6,100,603 A 8/2000 Gold
(Continued)

FOREIGN PATENT DOCUMENTS

CN 1956018 A 5/2007
CN 101357622 A 2/2009
(Continued)

OTHER PUBLICATIONS

PCT/US2013/041824 International Search Report and Written Opinion, dated Jul. 24, 2013.
(Continued)

*Primary Examiner* — Craig A. Renner
(74) *Attorney, Agent, or Firm* — Tarolli, Sundheim, Covell & Tummino LLP

(57) ABSTRACT

A method and apparatus for hand-free opening and/or closing of a vehicle door. The method includes the steps of detecting when an authorized person is in the vicinity of a vehicle door, opening that vehicle door after the authorized person has been in the vicinity of the vehicle door for a least a first time interval, the opening being performed automatically and without action by the authorized person, and providing a perceptible warning of impending opening of the vehicle door, the warning being provided after the authorized person has been detected in the vicinity of the vehicle door and before the vehicle door is opened. An analogous door closing process is performed when the authorized person leaves the vicinity of the vehicle door.

17 Claims, 5 Drawing Sheets

(51) Int. Cl.
*G08B 3/10* (2006.01)
*B60R 25/24* (2013.01)

(56) References Cited

U.S. PATENT DOCUMENTS

| | | | |
|---|---|---|---|
| 7,688,179 | B2 | 3/2010 | Kurpinski et al. |
| 2004/0005868 | A1 | 1/2004 | Desjeux et al. |
| 2004/0189046 | A1* | 9/2004 | Kawanobe et al. .. E05F 15/646 296/155 |
| 2006/0208854 | A1* | 9/2006 | Baumgartner et al. ............... B60R 25/2072 340/5.61 |
| 2007/0146120 | A1 | 6/2007 | Kachouh |
| 2008/0047329 | A1* | 2/2008 | Breed ............... G01N 35/00871 73/61.41 |
| 2009/0030579 | A1 | 1/2009 | Takehisa |
| 2009/0240845 | A1* | 9/2009 | Wiegand et al. ...... B60K 35/00 710/16 |
| 2010/0075655 | A1* | 3/2010 | Howarter et al. .. B60R 25/2009 455/420 |
| 2010/0075656 | A1* | 3/2010 | Howarter et al. .. B60R 25/2009 455/420 |
| 2010/0191392 | A1* | 7/2010 | Juzswik ............... B60R 25/245 701/2 |
| 2011/0102164 | A1* | 5/2011 | Ghabra ................. B60R 25/04 340/426.13 |
| 2011/0148573 | A1* | 6/2011 | Ghabra et al. ........ B60R 25/245 340/5.61 |
| 2012/0092129 | A1* | 4/2012 | Lickfelt ................. B60R 25/24 340/5.72 |
| 2013/0069760 | A1* | 3/2013 | Lickfelt ................. H04B 17/29 340/5.61 |

FOREIGN PATENT DOCUMENTS

| | | |
|---|---|---|
| CN | 201544854 U | 8/2010 |
| CN | 102104435 A | 6/2011 |
| EP | 0502566 | 9/1992 |

OTHER PUBLICATIONS

Kandarpunicef, "Automatic Car Door and Mirror Open Close Part 2", YouTube Video, Jul. 5, 2011, retrieved from the internet. Retrieved on Apr. 13, 2016.

* cited by examiner

'LF Interrogation'
Interrupt Servicing Routine

METHOD AND APPARATUS FOR HANDS-FREE OPENING OF A DOOR

RELATED APPLICATION

This application claims priority from U.S. Provisional Patent Application Ser. No. 61/650,285, filed 22 May 2012, the subject matter of which is incorporated hereby incorporated by reference in its entirety.

FIELD OF THE INVENTION

The present invention is directed to a method of and apparatus for operating a vehicle door, hatch, or gate without use of one's hands.

BACKGROUND

Motor vehicles are often equipped with a remote keyless entry ("RKE") system that allows a person to lock or unlock a door of the vehicle remotely. RKE systems include a portable, battery-powered radio transmitter, known as a fob, that is small enough to be carried conveniently in a person's pocket or purse. The fob includes a number of small buttons that can be pressed to activate some vehicle function via the radio link with the vehicle. In some proposed designs, a radio link is automatically established upon arrival of an authorized person at the vehicle, without overt action by the person, and the system then responds by unlocking one or more of the vehicle doors. Different technical approaches for implementing such a "passive" RKE function are shown in, for example, U.S. Pat. Nos. 4,942,393 and 6,181,254. Although, in such systems, the doors are unlocked in a hands-free manner, it is still necessary for the person to manually open, or overtly trigger the opening, of the vehicle door.

SUMMARY OF THE INVENTION

The present invention provides a method and apparatus for hand-free opening and/or closing of a vehicle door, hatch, or gate.

In accordance with one example embodiment of the present invention, a method for opening of a vehicle door is provided that includes the steps of detecting when an authorized person is in the vicinity of the vehicle door, automatically opening the vehicle door when the authorized person has been in the vicinity of the vehicle door for at least a first time interval, and providing a perceptible warning of impending opening of the vehicle door, the warning being provided after the authorized person has been detected in the vicinity of the vehicle door but before the vehicle door is opened.

In accordance with another example embodiment of the present invention, apparatus is provided for opening of a vehicle door, for use in a system including an actuator that is operable to move the vehicle door between open and closed positions. A portable transceiver is adapted to be carried in a pocket or purse of an authorized person and is operable to communicate with a vehicle-mounted transceiver via radio signals. The vehicle-mounted transceiver includes a receiver that determines from the radio signals whether the portable transceiver is in the vicinity of the vehicle door. A controller responsive to the receiver causes the actuator to open the vehicle door when the portable transceiver has been in the vicinity of the vehicle door for a first time duration. A warning circuit causes the issuance of a perceptible warning to warn the authorized person of impending opening of the vehicle door after the portable transceiver has been determined to be in the vicinity of the vehicle door but before the actuator opens the vehicle door.

In accordance with yet another example embodiment of the present invention, a similar method is used for automatic closing of the vehicle door after the authorized person has left the vicinity of the vehicle door.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
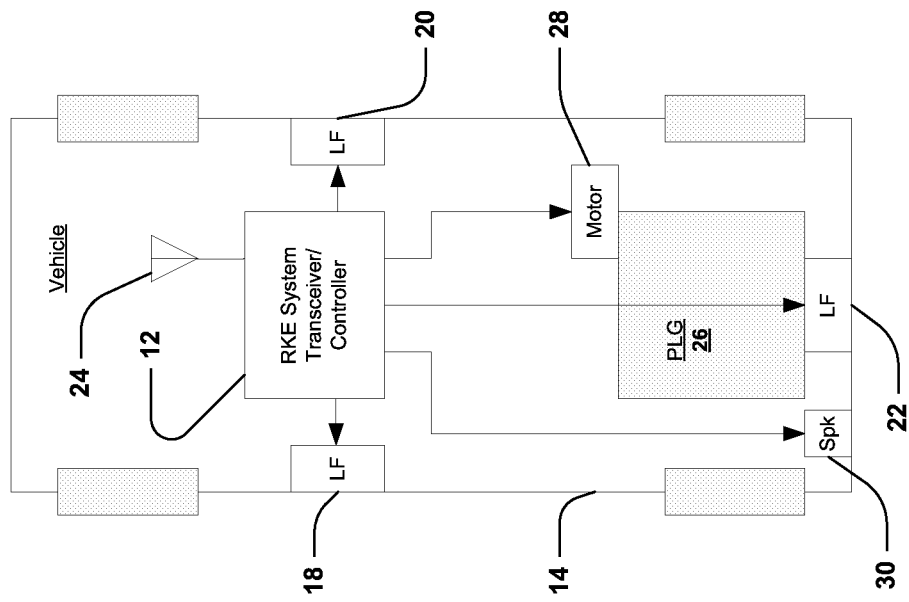
FIG. 1 is a block diagram of an RKE system in accordance with one example embodiment of the present invention.
Figure 1:
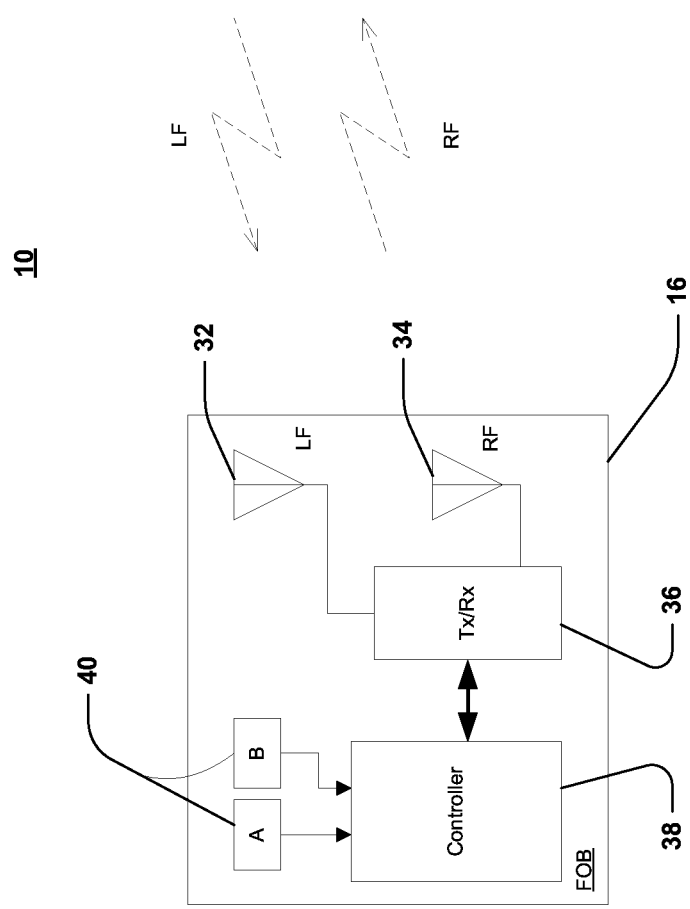

Referring to FIG. 1, an RKE system 10 is shown including a transceiver/controller 12 mounted in a motor vehicle 14 and a portable, complementary fob 16. In the illustrated example embodiment, the transceiver/controller 12 communicates with the fob 16 via two radio frequency ("RF") links; a 125 kHz low frequency ("LF") link from the transceiver/controller 12 to the fob 16, and a 315 MHz very high frequency ("VHF") link from the fob 16 to the transceiver/controller 12. Consistent with usual convention, the lower frequency signal will be referred to as the LF signal and the VHF signal will just be referred to as the RF signal, but in fact both signals are RF signals.

The vehicle 14 is equipped with several LF antennas 18, 20, 22. LF antennas 18, 20 are located at each of the front doors and the other antenna 22 is located near the liftgate at the rear of the vehicle. The transceiver/controller 12 is operatively coupled to each antenna and will selectively broadcast an LF signal through one of the LF antennas at a time. The LF signal broadcast by each antenna is quite localized, having a short range that does not significantly overlap the effective broadcast ranges of the other LF antennas. Thus, if a fob 16 is in a location to receive an LF signal from one antenna it is unlikely, while in that location, also to receive an LF signal broadcast by another one of the antennas. Additionally, the FOB measures and reports the LF field strength back to the transceiver/controller, enabling location determination even if there is LF broadcast range overlap. These attributes (limited LF broadcast range, LF measured amplitude at fob) are used to discriminate the location of the fob 16 around the vehicle.

The vehicle is further equipped with an omnidirectional RF antenna 24. The antenna 24 is connected to and controlled by the transceiver/controller 12, and will preferably be mounted on the same printed circuit board as the other electronic elements of the transceiver/controller 12. The RF signal used to communicate commands from fob 16, being of a much higher frequency than the LF signal, propagates much farther than the LF signal. The antenna 24 is thus capable of receiving RF signals broadcast from a significant distance at all directions around the vehicle 14.

The transceiver/controller 12 includes actuator drivers, not separately illustrated, for powering actuators that are used to control access to the various doors, hatches and gates of the vehicle. (The term "door" will sometimes be used as a shorthand reference to any door, hatch or gate of the vehicle.) Most of the actuators are door lock/unlock solenoids. The door lock/unlock solenoids are controlled in a conventional manner by transceiver/controller 12 in response to the RF signals sent from the fob 16. Those processes are generally known and will be mentioned and described herein in no more than a summary fashion.

The vehicle has a rear hatch 26, referred to as a power liftgate ("PLG"), that is equipped with an actuator 28. Actuator 28 includes a motor and suitable gears and levers for latching and unlatching PLG 26 and opening and closing the PLG. Actuator 28 is electrically connected to, and controlled by, a driver within the transceiver/controller 12.

A speaker or buzzer 30 is provided, also controlled by transceiver/controller 12. The speaker 30 preferably is mounted in or around the PLG 26, and is included in order to give to those persons in the area an audible warning that the PLG 26 is about to move between open and closed positions. Of course, some other means of providing a perceptible warning could be provided instead, such as a warning light.

The fob 16 is equipped with LF and RF antennas 32 and 34, respectively, so that fob 16 may receive the LF signals broadcast from the various LF antennas 18, 20, and 22 on vehicle 14 and may transmit an RF signal to the RF antenna 24 on vehicle 14. The antennas 32 and 34 are connected to a transmitter/receiver 36, which in turn is connected to and controlled by controller 38. The controller 38 may be an application specific integrated circuit ("ASIC") configured as a state machine, or a programmed microcomputer. In either case, the controller 38 will monitor the states of buttons 40 on the fob 16 and broadcast via RF antenna 34 suitable RF messages responsive to button depressions performed by the person holding the fob. Controller 38 will also cause transmitter/receiver 36 to listen for LF signals received by LF antenna 32 and will broadcast via RF antenna 34 suitable RF messages responsive to the LF signals received including, as previously stated, the amplitude of the received LF signal. In either case, the RF messages will include a secure identification code uniquely identifying the fob 16. If the fob 16 is an authorized fob for that specific vehicle 14, then the identification code will be recognized by the transceiver/controller 12 on the vehicle 14. The person carrying an authorized fob is presumed to be authorized to access the vehicle and thus will be referred to as an authorized person.

The transceiver/controller 12 includes a microcomputer of generally conventional construction, not separately shown, including a system clock generator, a central processing unit (CPU), program memory (ROM), random access memory (RAM), programmable timers, interrupt controllers, serial interfaces, and so on. In accordance with the present invention, the microcomputer within transceiver/controller 12 is programmed to detect when an authorized person is adjacent to PLG 26, to issue a perceptible warning to the authorized person, and then to open PLG 26 automatically and without overt action by the authorized person. Conversely, transceiver/controller 12 is also programmed to detect when an authorized person has left the vicinity of the PLG 26 while the PLG is open, to issue a perceptible warning to those nearby, and then to close the PLG 26 automatically and without overt action by the authorized person.

Figure 2:
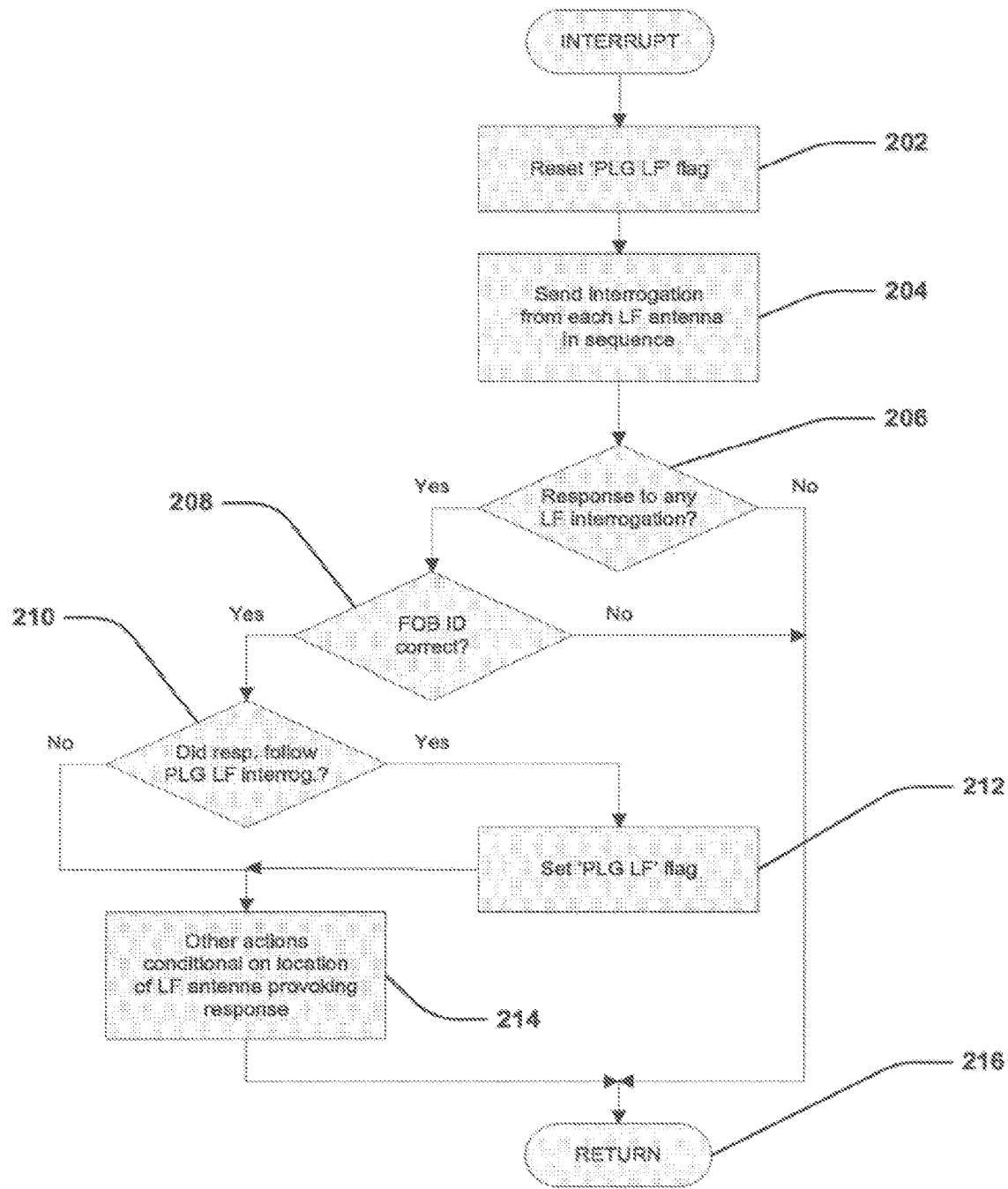
FIG. 2 is a flow chart of a control process periodically performed by the vehicle-mounted transceiver/controller to interrogate and thereby detect nearby fobs in the example embodiment of FIG. 1.

The process for detecting the proximity of an authorized person is performed by the microcomputer within transceiver/controller 12 on a periodic schedule, as determined by one of the timers contained within the transceiver/controller. The timer issues an "LF interrogation" interrupt signal when the timer determines that the time for LF interrogation has arrived. FIG. 2 is a flow chart of the process performed by the microcomputer in response to each such periodic raising of the "LF interrogation" interrupt signal. At the outset (step 202) the microcomputer will reset a "PLG LF" flag. The "PLG LF" flag is used to indicate to later processes whether or not the fob 16 was detected in the vicinity of the PLG 26. By resetting of the flag in step 202, the flag will be at the default value of "fob not detected adjacent PLG" unless it is set to a different value at a later point in this interrupt servicing routine.

As illustrated in the figure at step 204, the transceiver/controller 12 causes an LF interrogation signal to be broadcast by each of the LF antennas 18, 20, and 22 in turn, one after the other. Fob 16, if in a location to receive one of the LF interrogation signals, will respond with an RF response message. Transceiver controller 12 will listen for such an RF response following the LF interrogation by each of the LF antennas 18, 20, 22. If no RF response is detected (step 206) after all of the LF interrogations have been broadcast, then the interrupt servicing routine is exited at step 216. If an RF response is detected following one of the LF interrogation signals, however, then the fob ID embedded in the RF response is checked in step 208. If the fob ID is not authorized for this vehicle, the RF response is ignored and the interrupt servicing routine again exits at step 216. If the fob ID is authorized for this vehicle, certain actions are performed in steps 210-214. At step 210, the microcomputer checks whether the LF response occurred following the LF interrogation by the PLG LF antenna 22 and, if so, whether the amplitude of the LF signal at the fob, as indicated in the message received from the fob, is above a threshold amplitude representing a preset proximity of the fob to the LF antenna. If yes, then program flow is branched to step 212. At step 212 the "PLG LF" flag is set, thereby indicating to other processes (specifically main loop processes—see FIGS. 3, 4 and 5) that an authorized person is at that moment adjacent to the PLG. Other actions, e.g. unlocking of other doors, may be appropriate following steps 210 and 212, depending upon which antenna provoked the RF response. Such other actions are performed at step 214 before the interrupt servicing routine is exited at step 216.

The microcomputer within transceiver/controller 12 performs the interrupt servicing routine periodically. When not performing the FIG. 2 interrupt servicing routine or some other interrupt servicing routine, however, the microcomputer is performing main loop processes.

Figure 3:
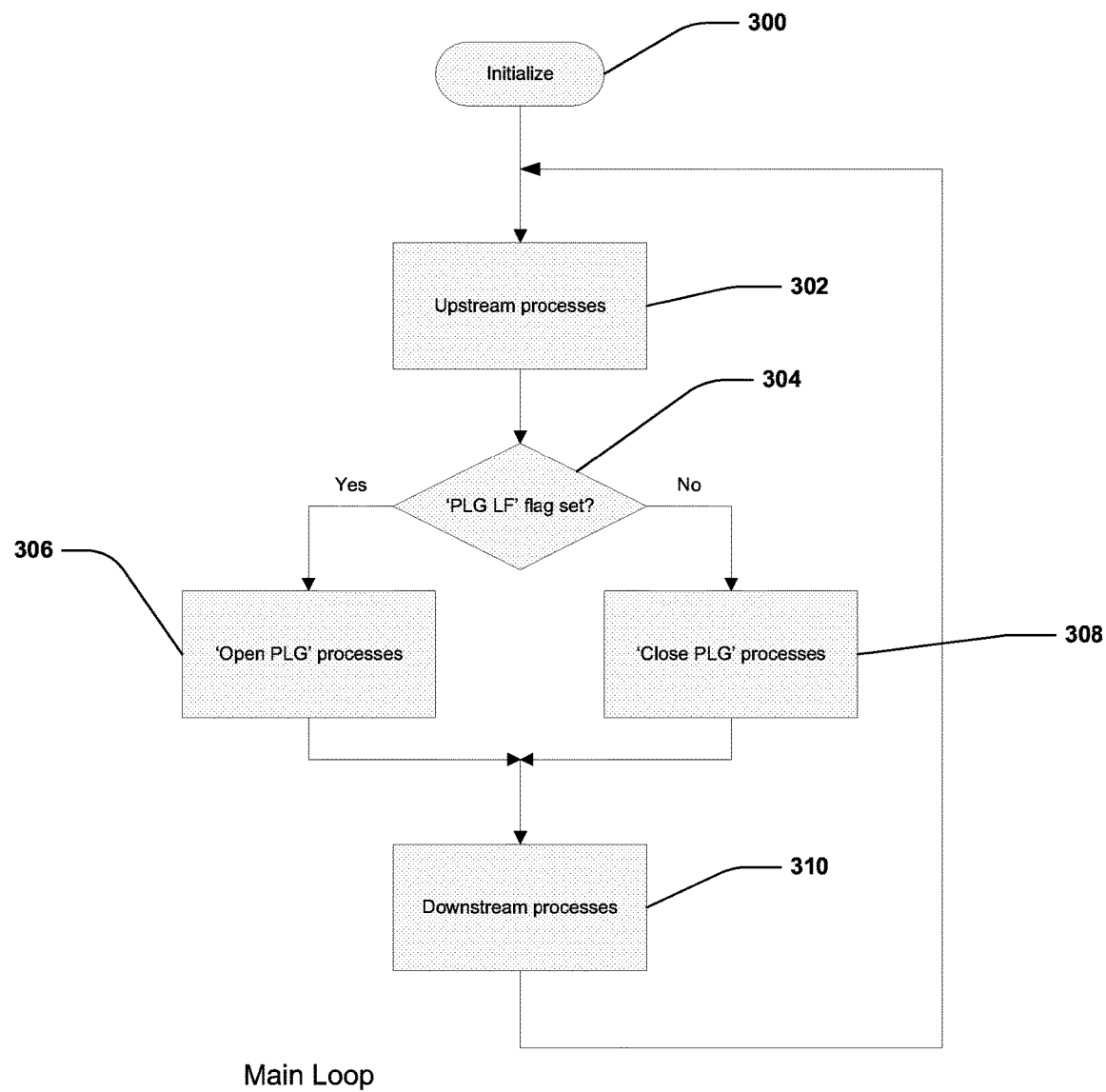
FIG. 3 is a flow chart of the 'main loop' control processes performed by the vehicle-mounted transceiver/controller in the example embodiment of FIG. 1.

FIG. 3 is a flow chart of the main loop processes performed by the microcomputer in transceiver/controller 12. When power is first applied to the system, the system initializes in step 300 and then proceeds into a main loop. The main loop is repeated continuously as long as the vehicle battery remains connected to the vehicle electrical systems, without regard to whether the vehicle ignition is on or off. Various operations are performed in the main loop that are conventional and are not the subject of the present invention. Those operations are grouped together into upstream processes 302 and downstream processes 310. Such processes may include, for example, listening for unprovoked RF messages from fob 16. An 'unprovoked' RF message is one transmitted by fob 16 in response to depression of one of the buttons 40, rather than in response to an LF signal broadcast by the vehicle.

The main loop steps in accordance with one example embodiment of the present invention are shown at steps 304-308, and are dependent upon the present state of the PLG LF flag. If the flag is set, indicating that an authorized fob and thus the authorized person is adjacent to the PLG, then program flow branches to step 306 where processes are performed to initiate or continue the opening of the PLG or to cancel the closing of the PLG, as appropriate. The main loop is performed rather quickly; many passes through the main loop will occur between the time that the PLG LF flag is first set and the time that the audible warnings, described in more detail below, are finished and opening of the PLG is actually triggered. If the flag is not set, indicating that the fob is not adjacent the PLG (perhaps the person just moved out of range of the LF interrogation signal, for example) then program flow instead branches to step 308, where any cancellable actions associated with PLG opening are terminated or the PLG is closed, as appropriate.

Figure 4:
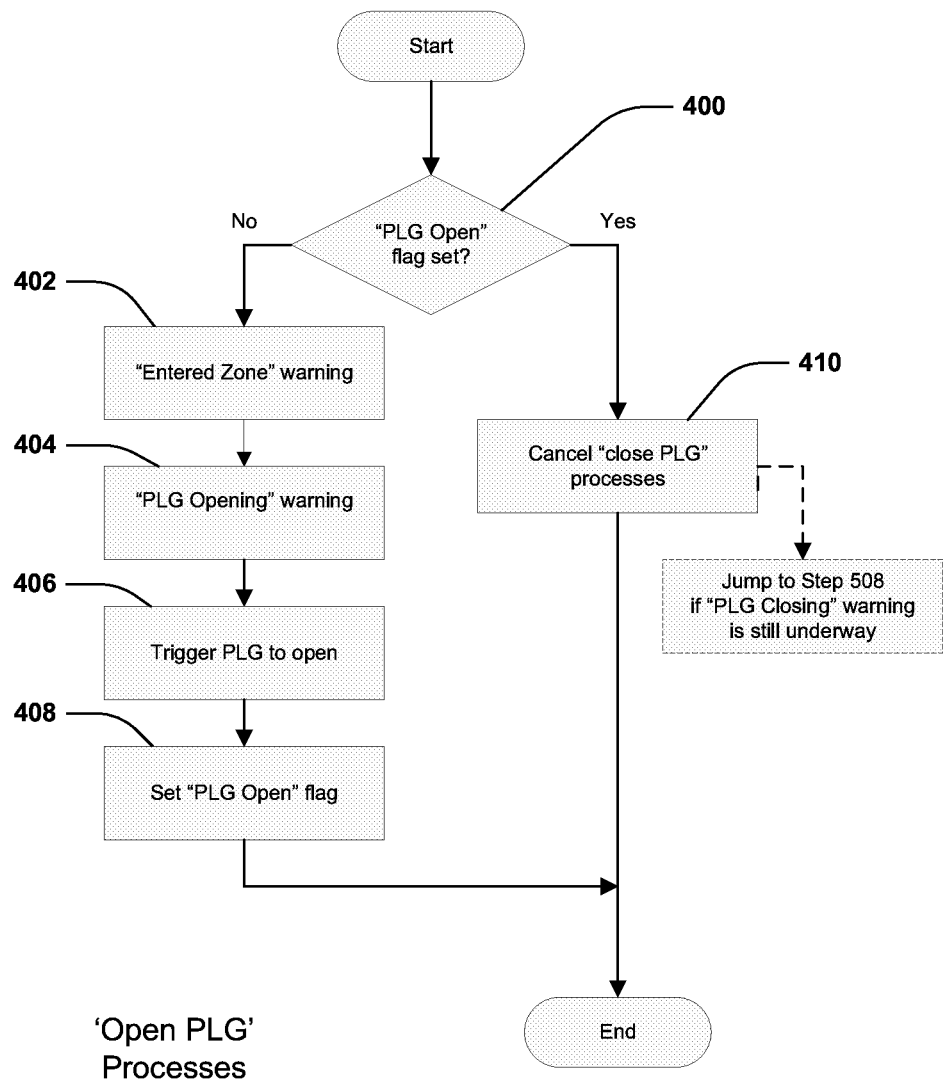
FIG. 4 is a flow chart of an "open power liftgate" subroutine of the main loop of FIG. 3, performed by the vehicle-mounted transceiver/controller when an authorized fob has arrived in the vicinity of the power liftgate; and, FIG. 5 is a flow chart of a "close power liftgate" subroutine of the main loop of FIG. 3, performed by the vehicle-mounted transceiver/controller when an authorized fob has left the vicinity of the power liftgate.

FIG. 4 illustrates the 'Open PLG' subroutine that is performed at each pass through step 306 of FIG. 3. The present state of the PLG is indicated by a "PLG Open" flag (set in step 408, see below), whose state is tested in step 400. If the PLG is not open, then the automatic opening of the PLG should commence. The conditional step 400 will shift program flow to step 402 to give to the authorized person and other people in the same area a perceptible warning of the impending opening of the PLG. In the embodiment being described, the perceptible warning is an audible warning that includes two discrete parts: an "Entered Zone" warning given upon entry of the fob into the PLG zone, and a "PLG Opening" warning given upon the initiation of opening of the PLC. Each warning is generated by speaker or buzzer 30 under control by the transceiver/controller 12.

The "Entered Zone" warning, initiated and managed in step 402, alerts the authorized person that he or she has entered the zone or area around the PLG and that the system will open the PLG if he or she remains in that zone. In the preferred embodiment, the "Entered Zone" warning is three discrete chirps of a single tone (e.g. 600 Hz), each lasting half a second, separated from one another by one second of silence. The authorized person may leave the zone during the "Entered Zone" warning to avoid the opening of the PLG. If the authorized person remains in the zone for the entirety of the "Entered Zone" warning, then the system in step 404 irrevocably initiates the opening of the PLG by sounding the second part of the audible warning, referred to herein as the "PLG Opening" warning. The "PLG Opening" warning warns the authorized person that the PLG opening has been initiated and will occur momentarily. In the preferred embodiment, the "PLG Opening" warning is three discrete chirps of the same tone (e.g., 600 Hz), each lasting half a second, separated from one another by half a second of silence.

Following the "PLG Opening" warning, the opening of the PLG is actually triggered via the PLG actuator 28 in step 406, whereupon actuator 28 unlatches the PLG and moves it from closed to open positions. The actuator, once triggered in step 406, will continue to operate until the gate is fully open or some intervening event occurs (e.g. excess motor current, too much time has elapsed, some other fault event, or the operator pushes a 'close PLG' button on fob 16). Departure of the fob from the PLG zone during the "PLG Opening" warning or thereafter will not stop the opening process, once it has been initiated. The "PLG Open" flag is then set in step 408, following the triggering of the PLG actuator. The opening of the PLG will thus have been initiated but not completed when the "PLG Open" flag changes to the 'set' state.

Since the "PLG Open" flag was set in step 408 to indicate that the PLG is open, subsequent passes through step 400 will cause the subroutine to bypass the warnings and other actions. The "PLG Open" flag, once set in step 408, will be reset in two ways that will be described below with reference to FIG. 5.

The "Entered Zone" and "PLG Opening" warnings produced during the FIG. 4 processes will sound perceptibly different. As described above, the "Entered Zone" warning is a slow series of beeps or chirps, and the "PLG Opening" warning is a faster series of beeps or chirps. The process of generating these audible warnings is conventional and is not shown in detail in the flowchart.

Each warning will last for several seconds, and thus the microcomputer in the transceiver/controller 12 will pass through the main loop many times while the warnings are being sounded. As a consequence, the entire "Entered Zone" warning will not be generated during a single pass through step 402, and similarly the entire "PLG Opening" warning will not be generated during a single pass through step 404. The succeeding steps, however, will be skipped for the duration of the respective warnings. The microcomputer will keep track of the progress of each warning through appropriate timers and flags, and will skip succeeding steps that are not ripe for action until the entire warning has been sounded. Thus, during each main loop pass while the "Entered Zone" warning is sounding, the microcomputer will determine that the "Entered Zone" warning is not complete and will cause steps 404, 406, and 408 to be skipped in that pass. Similarly, during each main loop pass while the "PLG Opening" warning is sounding, the microcomputer will determine that the "PLG Opening" warning is not complete and will cause steps 406 and 408 to be skipped in that pass. The omitted steps will be taken, at their illustrated places in the FIG. 4 process, when the microcomputer determines in the respective warning step 402, 404 that the associated warning is complete. For simplicity of illustration, this temporary branching of program flow around some of the steps is not shown in the figures.

As stated previously, if the authorized person leaves the zone around the PLG during the sounding of the "Entered Zone" warning, then the PLG LF flag will be reset (via the FIG. 2 interrupt servicing routine) and program flow through the main loop will be diverted away from step 306 via step 304. The "Entered Zone" warning underway will then be terminated as part of the processes performed at step 308. Steps 404 and succeeding steps 406 and 408 therefore will not be executed if the authorized person leaves the zone before the "Entered Zone" warning has ended.

Steps 402-408, described above, will take place if it is determined in step 400 that the PLG is not open. If it is instead determined in step 400 that the PLG is already open, as indicated by the "PLG Open" flag, then no warnings or "opening" actions are required. Instead, program flow branches to step 410. In step 410 certain automated PLG closing processes are terminated. This step will be described hereafter in connection with FIG. 5. No further action is required after step 410, and thus the subroutine is done for this pass through the main loop, and flow returns to the downstream processes 310 (FIG. 3).

Figure 5:
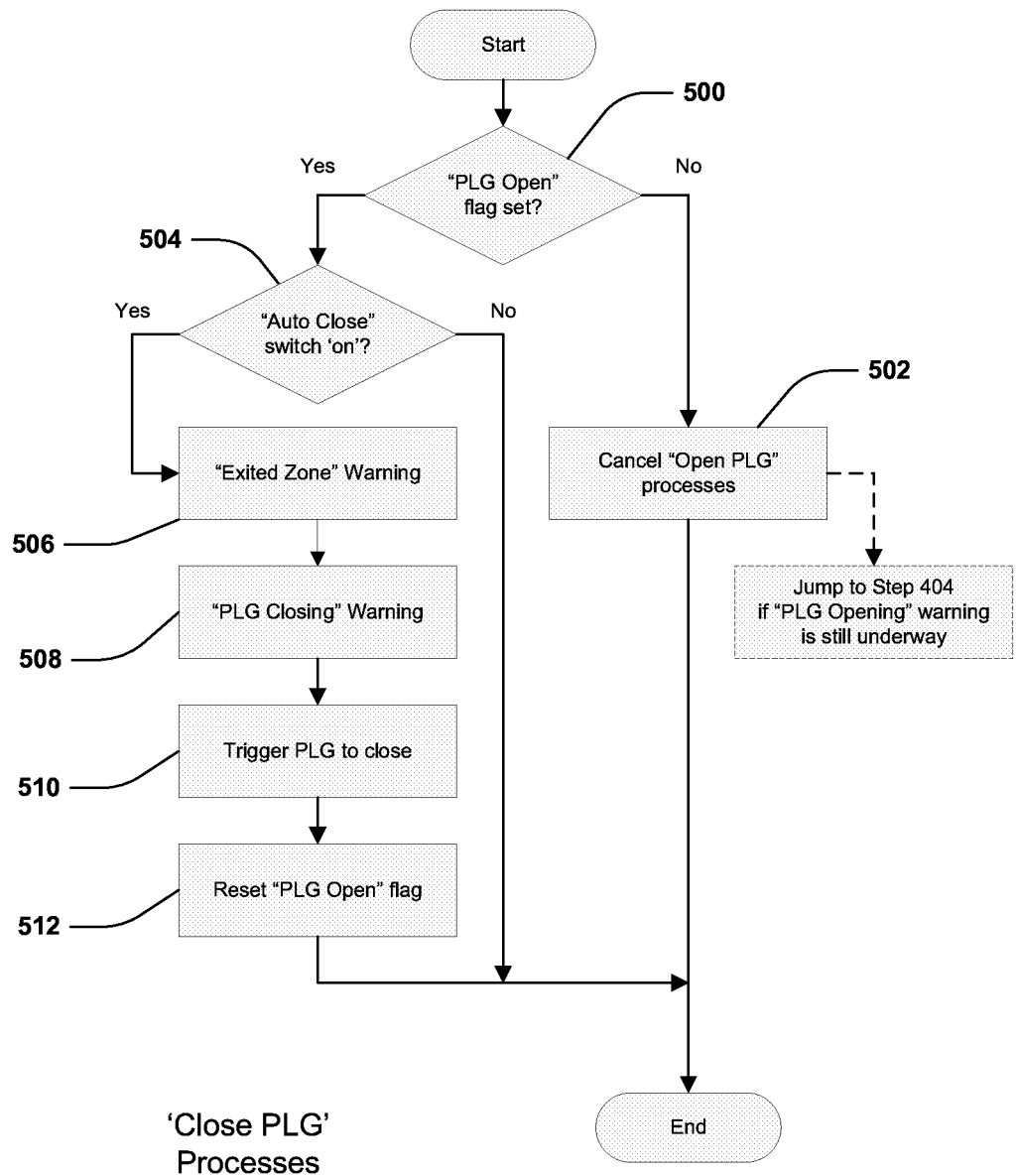

Referring now to FIG. 5, the processes performed as part of step 308 of FIG. 3 are shown. Program flow will be diverted to step 308, and thus the FIG. 5 processes, only when it is determined (step 304, FIG. 3) that the authorized fob is not in the vicinity of the PLG. The state of the "PLG Open" flag is tested in the first step 500 of the FIG. 5 processes. If the flag is not set, indicating that the opening of the PLG has not been triggered, then program flow branches to step 502. At step 502 the cancellable actions of the "Open PLG" processes are cancelled, including the resetting of all of the flags and timers associated with the "Entered Zone" warning of step 402 (FIG. 4). Thus, step 502 will cut short the "Entered Zone" warning, if that warning is then underway, and will then proceed to exit the subroutine of FIG. 5. The cancellation of the warning will occur if the authorized person, carrying the fob, enters the PLG zone but then leaves the zone again before the end of the "Entered Zone" warning.

The "PLG Opening" warning, on the other hand, will not be cancelled in step 502. If the microcomputer determines, by examining flags and timers in step 502, that a "PLG Opening" warning is underway, then, even though the "PLG LF" flag is not set at that time, the microcomputer will nonetheless jump to step 404 of FIG. 4 rather than proceeding to normal exiting of the FIG. 5 subroutine. The redirection from step 502 to step 404 and the following FIG. 4 steps will continue in subsequent passes through the FIG. 5 process until the "PLG Open" flag is eventually set in step 408. After setting of the "PLG Open" flag, at the next pass through step 500, the "PLG Open" flag will be found to be set.

When the "PLG Open" flag is set, however, indicating that the PLG is open (meaning that PLG 26 is either fully open or that opening is in progress), then program flow branches to a series of steps that function to close the PLG, automatically, in a warning and initiation process analogous to the warning and initiation process of the opening procedure described above with respect to FIG. 4. First it is determined in step 504 whether the vehicle operator has enabled the "Auto Close" function. The vehicle operator would enable the function, for example, by operation of a mechanical switch (not shown) on the dashboard of the vehicle or, alternatively, by making a selection from a menu on a touch panel on the dashboard. A manual switch could also, or instead, be located at the rear of the vehicle (e.g., on the interior trim just inside the PLG, on the lip of the PLG itself, on the PLG frame, etc.) so that the function could be triggered by the vehicle operator while standing adjacent to the open PLG. If the "Auto Close" function has been enabled, then steps 506-512, which are associated with this function, are performed. Otherwise ("Auto Close" function not enabled) program flow will bypass those steps and instead emerge from the FIG. 5 processes and continue with downstream processes 310 (FIG. 3).

Step 506 will be reached, therefore, only when the PLG LF flag is reset (fob not in the vicinity of the PLG), the "PLG Open" flag is set (the PLG is open) and the "Auto Close" switch is 'on' (Auto Close function is enabled). In step 506 an "Exited Zone" warning is given. The warning is similar in form to the "Entered Zone" warning given in step 402 of the "Open PLG" processes of FIG. 4. The timing of the warning and/or the tone of the warning may be altered to give the "Exited Zone" warning at step 506 an audibly distinct sound.

If the "Exited Zone" warning of step 506 runs to completion, then a "PLG Closing" warning is initiated at step 408. The "PLG Closing" warning is similar in form to the "PLG Opening" warning given in step 404 of the "Open PLG" processes of FIG. 4. The timing of the warning and/or the tone of the warning may be altered to give the "PLG Closing" warning at step 508 an audibly distinct sound. Completion of the "PLG Closing" warning will lead to the triggering in step 510 of the PLG actuator to close the PLG and the resetting in step 512 of the "PLG Open" flag.

The "Auto Close" function will begin the warning processes when the authorized fob leaves the PLG zone while the PLG is still open. If the authorized fob, and thus presumptively the authorized person, reenters the PLG zone before the PLG closes, then the consequent setting of the PLG LF signal will cause program flow to shift to the "Open PLG" processes via step 304 and to then be diverted, via decision step 400, to step 410 of FIG. 4. One of the functions performed in step 410 will be to cancel the "Exited Zone" warning of step 506, if that warning is then in progress. Thus, if the "Exited Zone" warning associated with the "Auto Close" function has already started via step 506, a reentry of the authorized person into the area of the PLG will cancel the "Exited Zone" warning and the "Auto Close" function.

However, as with the "PLG Opening" warning of step 404, the "PLG Closing" warning is not cancellable. If the authorized person (with fob) re-enters the PLG zone during the sounding of the "PLG Closing" warning, then the microcomputer will jump from step 410 to step 508, for completion of the closing process.

The "PLC Open" flag, set in step 408, may be reset in one of two ways. First, it may be reset by upstream or downstream process as a result of a manually initiated, motorized closing of the PLG. More specifically, such upstream or downstream process will reset the "PLG Open" flag when someone has pressed a mechanical button (not shown) initiating a motorized closing of the PLG. The resetting of the "PLG Open" flag will be delayed, however, until after the "PLG LF" flag has also been reset, however, indicating that the fob and thus the authorized user have left the vicinity of the PLG. Thus, if the manual button is pressed to trigger the motorized closing of the PLG, the "PLG Open" flag will remain set until the authorized fob has left the PLG zone. This prevents the automated opening process described above from immediately reopening the PLG.

Second, the "PLG Open" flag may be reset as part of the automated closure process shown in FIG. 5. After the "Exited Zone" and "PLG Opening" warnings of steps 506 and 508, and the triggering of the PLG to close in step 510, the "PLG Open" flag is reset in step 512 at the conclusion of the 'close PLG' processes of FIG. 5.

Various refinements and variations of the described processes and apparatus are envisioned.

For example, it is desirable that the PLG not open and close unnecessarily, and consequently it may be desirable in some implementations to include built-in delays at selected points in the process. When the "PLG Open" flag changes state, e.g., it may be desirable to include a brief delay (e.g. 5 seconds) before the auto open or auto close functions may next be initiated.

It may similarly be desirable to include a brief delay (e.g., 2.5 seconds) before beginning the "Entered Zone" warning of step 402, to avoid the "Entered Zone" warning from sounding when the person merely walks past the PLG upon leaving the car.

Further, it may be desirable to inhibit the automatic opening of the PLG when the fob LF signal strength indicates that the authorized person is standing so close to the PLG that the PLG might make incidental physical contact with the authorized person when sweeping from closed to open positions. This feature may be implemented, e.g., by continuing the "PLG Opening" warning of step 404 until the fob LF signal strength indicates that the authorized person is not within the opening sweep of the PLG.

Evaluation of LF signal strength is the preferred method of determining the location of the authorized person for purposes of this 'inhibit' function, but it is not the only method. The PLG LF signal already provides an indication of the location of the fob. Thus, one alternative would be for the "PLG Opening" warning of step 404 to be continued until the PLG LF signal resets, indicating that the authorized person has stepped entirely out of the PLG zone. In such a system, it could be disturbing to the authorized person and others in the vicinity of the vehicle for the "PLG Opening" warning to continue without end when the authorized fob fails to clear the PLG zone. This might happen, perhaps, if the fob were left in a shopping cart adjacent the PLG. To prevent this, the concept could be refined by discontinuing the "PLG Opening" warning and resetting the PLG opening process if the authorized fob remained within the opening sweep of the PLG for more than a certain preset amount of time.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for opening of a vehicle door comprising:
   a portable transceiver adapted to be carried by an authorized person;
   a vehicle-mounted apparatus including an actuator operable to move a vehicle door between open and closed positions automatically, a warning device for generating perceptible warnings, and a vehicle transceiver adapted to communicate with said portable transceiver;
   a controller responsive to said vehicle transceiver for causing said actuator to open said vehicle door when said portable transceiver has been in the vicinity of said vehicle door for a first time duration, and for causing said warning device to issue a perceptible warning before said actuator opens said vehicle door; wherein said perceptible warning includes a first sound to indicate that the portable transceiver has been determined to be in the vicinity of the vehicle door and a second sound warning of impending opening of the vehicle door, said first sound being distinctively different from said second sound.

2. Apparatus as set forth in claim 1, wherein said controller further causes said actuator to close said vehicle door when said portable transceiver has moved away from the vicinity of said vehicle door, and for causing said warning device to issue a perceptible warning before said actuator closes said vehicle door.

3. Apparatus as set forth in claim 1, wherein said first sound is configured to be issued for the length of the first time duration after the portable transceiver has been determined to be in the vicinity of the vehicle door and said second sound is configured to be issued after the completion of the first time duration and before the actuator is operated to begin opening the vehicle door.

4. A method for opening of a door of a vehicle, comprising the steps of:
   detecting an authorized person in the vicinity of the vehicle door,
   automatically opening the vehicle door when the authorized person has been in the vicinity of the vehicle door for at least a first time interval, and
   providing a perceptible warning of impending opening of the vehicle door, said warning being provided after the authorized person has been detected in the vicinity of the vehicle door but before the vehicle door is opened, the perceptible warning including a first sound to indicate that the authorized person has been detected and a second sound warning of impending opening of the vehicle door, the first sound being distinctively different from the second sound; wherein the step of detecting an authorized person in the vicinity of the vehicle door comprises:
   transmitting an LF signal from the vicinity of the vehicle door;
   detecting the LF signal at the authorized person;
   transmitting an RF message at the authorized person upon detection of the LF signal; and
   receiving the RF message at the vehicle.

5. A method as set forth in claim 4, wherein said step of detecting an authorized person comprises the step of detecting when an authorized person is in the vicinity of a rear door on said vehicle, and wherein said step of automatically opening comprises the step of automatically opening the rear door.

6. A method as set forth in claim 4, and further comprising the step of discontinuing said warning and said automatic opening when said authorized person leaves the vicinity of the vehicle door before said first time interval has elapsed.

7. A method as set forth in claim 4, and further comprising the steps of:
   automatically closing the vehicle door when the authorized person has left the vicinity of the vehicle door and remained outside of the vicinity of the vehicle door for at least a second time interval, and
   providing a perceptible warning of impending closing of the vehicle door, said perceptible warning of impending closing of the vehicle door being provided after the authorized person has left the vicinity of the vehicle door but before the vehicle door is closed.

8. A method as set forth in claim 4, wherein the step of transmitting an RF message at the authorized person comprises transmitting a message comprising a fob identification, and wherein the step of receiving the RF message at the vehicle comprises checking the fob identification to determine whether the fob identification is authorized for the vehicle.

9. A method as set forth in claim 4, further comprising the step of measuring the amplitude of the LF signal received at the authorized person and transmitting the measured amplitude of the LF signal as an indication of proximity of the authorized person to the vehicle door.

10. A method as set forth in claim 4, wherein said first sound is provided for the duration of the first time interval after the authorized person has been detected in the vicinity of the vehicle door and said second sound is provided after the completion of the first time interval and before the vehicle door begins to open.

11. Apparatus for opening a vehicle door, for use in a system including an actuator that is operable to move the vehicle door between open and closed positions, said apparatus comprising:
- a portable transceiver adapted to be carried by an authorized person and operable to communicate with a vehicle transceiver via radio signals; and,
- said vehicle transceiver being adapted for mounting on a vehicle and operable to communicate with said portable transceiver via said radio signals, wherein said vehicle transceiver includes
- a receiver for determining from said radio signals when said portable transceiver is in the vicinity of the vehicle door,
- a controller responsive to said receiver for causing an actuator to open the vehicle door when said portable transceiver has been in the vicinity of the vehicle door for at least a first time duration;
- a warning circuit for causing the issuance of a perceptible warning to warn the authorized person of impending opening of the vehicle door after said portable transceiver has been determined to be in the vicinity of the vehicle door but before the actuator opens the vehicle door, said perceptible warning including a first sound to indicate that the portable transceiver has been determined to be in the vicinity of the vehicle door and a second sound warning of impending opening of the vehicle door, said first sound being distinctively different from said second sound; and
- a first RF antenna adapted for mounting on the vehicle and operative to receive RF signals from the portable transceiver and a first LF antenna adapted for mounting near the vehicle door and operative to transmit LF signals to the portable transceiver, wherein the portable transceiver includes a second LF antenna adapted for receiving LF signals transmitted by the first LF antenna and a second RF antenna adapted for transmitting RF signals to the first RF antenna.

12. Apparatus as set forth in claim 11, wherein said vehicle transceiver further includes an LF transmitter for transmitting LF signals from the vicinity of said vehicle door and wherein said portable transceiver further includes an LF receiver for receiving the LF signals transmitted from said LF transmitter.

13. Apparatus as set forth in claim 12, wherein said portable transceiver further includes an RF transmitter for transmitting an RF signal upon reception of an LF signal.

14. Apparatus as set forth in claim 13, wherein said receiver of said vehicle transceiver is configured to receive said RF signal transmitted by said portable transceiver, and wherein said controller includes a timer for initiating measurement of said first time duration upon first receipt of said RF signal.

15. Apparatus as set forth in claim 14, wherein said timer discontinues measuring said first time duration when said receiver determines that said portable transceiver is no longer in the vicinity of the vehicle door.

16. Apparatus as set forth in claim 11, wherein the portable transceiver is configured to receive via the second LF antenna LF signals transmitted from the vehicle via the first LF antenna, and transmit via the second RF antenna an RF message comprising an identification;
- and wherein the controller is configured to receive the RF message via the first RF antenna and check the identification to determine whether the portable transceiver is authorized for the vehicle.

17. Apparatus as set forth in claim 11, wherein said first sound is configured to be issued for the length of the first time duration after the portable transceiver has been determined to be in the vicinity of the vehicle door and said second sound is configured to be issued after the completion of the first time duration and before the actuator is operated to begin opening the vehicle door.

* * * * *